(12) United States Patent
Suekane et al.

(10) Patent No.: US 8,872,381 B2
(45) Date of Patent: Oct. 28, 2014

(54) UTILITY INTERCONNECTION AND INVERTER DEVICE

(75) Inventors: Kazuo Suekane, Osaka (JP); Atsushi Makitani, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 797 days.

(21) Appl. No.: 13/119,033

(22) PCT Filed: Sep. 18, 2008

(86) PCT No.: PCT/JP2008/066823
§ 371 (c)(1),
(2), (4) Date: Mar. 15, 2011

(87) PCT Pub. No.: WO2010/032300
PCT Pub. Date: Mar. 25, 2010

(65) Prior Publication Data
US 2011/0169344 A1 Jul. 14, 2011

(51) Int. Cl.
*H02J 1/10* (2006.01)
*H02J 3/38* (2006.01)

(52) U.S. Cl.
CPC .............. *H02J 3/383* (2013.01); *Y02E 10/563* (2013.01)
USPC ........................................... 307/80; 307/151

(58) Field of Classification Search
USPC .................................................. 307/80, 151
See application file for complete search history.

(56) References Cited

U.S. PATENT DOCUMENTS

2002/0149950 A1* 10/2002 Takebayashi .................... 363/16
2007/0241708 A1* 10/2007 Yamamoto et al. ........... 318/471

FOREIGN PATENT DOCUMENTS

| CN | 100421329 C | 9/2008 |
|---|---|---|
| JP | 07-036556 A | 2/1995 |
| JP | 09-051635 A | 2/1997 |
| JP | 2000-023369 A | 1/2000 |
| JP | 2000-197271 A | 7/2000 |
| JP | 2001-357867 A | 12/2001 |
| JP | 2002-271989 A | 9/2002 |
| JP | 2005-204485 A | 7/2005 |
| JP | 2005-295648 A | 10/2005 |
| JP | 2005312287 A * | 11/2005 |

OTHER PUBLICATIONS

International Search Report for corresponding International Application No. PCT/JP2008/066823 mailed Oct. 28, 2008.
International Preliminary Report on Patentability for International Application No. PCT/JP2008/066823 dated Dec. 21, 2010.

* cited by examiner

*Primary Examiner* — Rexford Barnie
*Assistant Examiner* — Joseph Inge
(74) *Attorney, Agent, or Firm* — Renner, Otto, Boisselle & Sklar, LLP

(57) ABSTRACT

A utility interconnection inverter device (7) includes an inverter circuit (21) that converts DC power generated by a solar panel (3) to AC power by switching a plurality of switching elements, and a controller (39) that controls the plurality of switching elements.

Moreover, fans (43, 45) are provided for cooling the plurality of switching elements.

Furthermore, a power supply circuit (a terminal 38, a transformer 40, and a power circuit 41) is provided, and supplies power from a control power supply (10) to the controller (39) and the fans (43, 45).

5 Claims, 4 Drawing Sheets

UTILITY INTERCONNECTION AND INVERTER DEVICE

TECHNICAL FIELD

The present invention relates to a utility interconnection inverter device that feeds in electrical power generated by a solar panel to a system power supply such as the commercial power supply or the like.

BACKGROUND ART

Since solar panel devices do not generate carbon dioxide while they generate electricity, they are currently receiving much attention as devices that serve to prevent global warming.

There is a type of prior art solar panel apparatus in which a utility interconnection inverter device converts DC power generated by a solar panel into AC power, and then feeds in this AC power to a utility system power supply (for example, refer to Patent Reference #1).

Patent Document #1: Japanese Laid-Open Patent Publication 2005-204485.

DISCLOSURE OF INVENTION

Problems to be Solved by the Invention

With such a prior art utility interconnection inverter device, electrical power generated by the solar panel has been supplied for operating a controller that controls the inverter circuit and for operating one or more fans that cool the inverter circuit. However, there has been the problem that it has not been possible to operate the controller and the fan in a stable manner, since the power generated by the solar panel varies according to the amount of insolation. Furthermore, there has been the problem that the amount of power fed in to the utility system power supply from this utility interconnection inverter device is diminished, since the controller and the fan consume power as described above.

Thus, objects of the present invention are to provide a utility interconnection inverter device with which a controller and a fan can operate in a stable manner, and moreover without any reduction of the power fed into the system power supply.

Means for Solving Problem

The utility interconnection inverter device according to the present invention includes an inverter circuit that includes a plurality of switching elements, and that converts electrical power generated by a solar panel from DC to AC by the switching operation of the plurality of switching elements. Furthermore, there is included a controller that controls the switching of the plurality of switching elements, and the AC power converted by the inverter circuit is fed into a system power supply. Moreover, there are included a power circuit to which are connected a first circuit by which power is supplied from the solar panel, and a second circuit by which power is supplied from a control power supply which is different from the system power supply; and that selects, from among the first circuit and the second circuit, that circuit by which power of the higher voltage is supplied, and supplies power to the controller from that selected circuit; and a first switch that opens and closes the second circuit. And there is included a power detection unit that detects the power generated by the solar panel. The controller changes over the first switch from closed to open, when the power detected by the power detection unit becomes less than a night time decision value for deciding that it is night time. Furthermore, the controller changes over the first switch from open to closed, when the power detected by the power detection unit becomes greater than or equal to the night time decision value.

With this structure, the power for driving the controller is supplied from the power circuit. Moreover, power is supplied from the control power supply to the power circuit when the power detected by the power detection unit is greater than or equal to the night time decision value for deciding that it is night time; while, when it becomes less than the night time decision value, then power is supplied from the solar panel to the power circuit. With this utility interconnection inverter device, the only electrical power which is generated by the solar panel when night time ends and morning dawns and sunlight shines upon the solar panel so it starts the generation of electricity or the like and which is not fed in to the system power supply is used for closing the switch from open to closed, while all the power except for this is supplied from the control power supply. Since the control power supply supplies stabilized power, which is different from the case for the solar panel, accordingly constant power is always supplied to the controller and to the fan, and thus it is possible to operate the controller and the fan in a stable manner. Furthermore, if this utility interconnection inverter device according to the present invention is used in a system in which the power generated by the solar panel is sold to a power company, then the power generated by the solar panel is fed in to the system power supply without any of it being consumed by the controller or the like. Due to this, it is possible to sell more power generated by the solar panel. Furthermore, with this utility interconnection inverter device, it is possible to prevent wastage of power, since the solar panel does not generate any electricity during the night time or the like and the supply of power to the controller is stopped.

Even further, according to another aspect of the present invention, the controller stops the switching of the plurality of switching elements, when the power detected by the power detection unit becomes lower than a generated power decision value for making a decision as to whether or not feeding in to the system power supply is possible.

When the power generated by the solar panel and detected by the power detection unit has become lower than the generated power decision value for making the decision as to whether or not it is possible to feed this power into the system power supply, this is considered as indicating that the power generated by the solar panel has become extremely low, and the operation of the switching elements is stopped, thus preventing wastage of power by the power supply circuit. For example, when the power generated by the solar panel is lower than the power consumed by the power supply circuit, then, since the power consumed by the power supply circuit is greater than the power that is fed in to the system power supply, accordingly the meaning of feeding in power to the system power supply disappears. Thus, in this type of case, the operation of the switching elements is stopped, so that the consumption of power by the controller is eliminated.

Still further, according to another aspect of the present invention, there are further included a second switch that connects the inverter circuit and the system power supply, and a voltage detector that detects the voltage of the system power supply. And the controller changes over the second switch from closed to open, when the voltage of the system power supply detected by the voltage detector becomes less than a breakdown decision value for deciding upon the occurrence of a system anomaly, so that a system anomaly is detected. By employing the structure described above, it is possible reliably to guarantee security so that the power generated by the solar panel during a system abnormality (such as a power cut or the like) is not outputted to the system power supply, since the utility interconnection inverter device according to the present invention is cut off from the system power supply during a system abnormality.

Yet further, according to another aspect of the present invention, this utility interconnection inverter device further includes a fan that cools the plurality of switching elements, and a temperature measurement unit that measures the temperature of the plurality of switching elements. And the controller increases the amount of cooling air flow to the fan when the power detected by the power detection unit becomes greater than or equal to a cooling decision value for deciding that it is necessary to provide additional cooling, or when the temperature measured by the temperature measurement unit becomes greater than or equal to a cooling decision temperature for deciding that it is necessary to provide additional cooling.

With this structure, when the power generated by the solar panel, or the temperature of the switching elements of the inverter circuit, becomes greater than or equal to a constant value, the amount of cooling air flow of the fan that cools the plurality of switching elements becomes greater. For example, a plurality of fans may be provided, and one only of these fans may be driven when the power generated by the solar panel or the temperature of the switching element is less than a fixed value. Furthermore, a plurality of the fans are driven when the power generated by the solar panel or the temperature of the switching element is greater than or equal to the fixed value. Due to this, it is possible to prevent heat being applied to the switching elements and it is possible to stabilize the efficiency of power conversion. Moreover, with this structure, the decision for increasing the amount of cooling air flow of the fans is made on the basis of two different values. The reason for doing this is that, even if for some reason a malfunction has occurred and one or the other of the cooling value decision or the cooling temperature decision has functioned erroneously, still it is possible reliably to cool the switching elements, and it is possible to prevent damage to the switching elements due to the application of heat.

Since heat is generated when the switching elements perform their switching operation, even after their switching operation has stopped, for some time the state in which heat is being applied continues, and there is a fear that the switching elements may be deteriorated. Thus, according to another aspect of the present invention, the controller operates the fan until the temperature measured by the temperature measurement unit becomes lower than the cooling decision temperature. Due to this, it is possible to prevent deterioration of the switching elements.

Effects of the Invention

According to the present invention, it is possible to operate the controller and the fan in a stable manner, since the power that is supplied to the controller and the fan is not the unstable power generated by the solar panel, but rather is the stable power from the control power supply. Moreover, if power is being fed in to the system power supply, there is no decrease of the amount of power, and it is possible to sell more power generated by the solar panel.

EXPLANATION OF REFERENCE NUMBERS

1: solar panel apparatus
3: solar panel
7: inverter device
9: system power supply
10: control power supply
11, 37, 38: terminals
13, 35, 36: interceptors
15, 29: noise filters
17, 33: voltage detectors
19, 25: current detectors
20: inverter circuit
21: switching element
20A, 23: smoothing circuits
27: boost circuit
31, 47, 48, 49: magnetic contactors
39: controller
40: transformer
41: power circuit
43, 45: fans

BEST MODE FOR CARRYING OUT THE INVENTION

With the present invention, except for during starting when the solar panel starts to generate electricity, the inverter device converts the DC power generated by the solar panel into AC power with an inverter circuit, and does not supply this AC power to the power circuit for the controller or to the fan, but feeds it into the system power supply. Furthermore, with this inverter device, power is supplied from the control power supply to the power circuit and to the fan. Due to this, more power generated by the solar panel is sold. In the following, this will be explained in detail.

Figure 1:
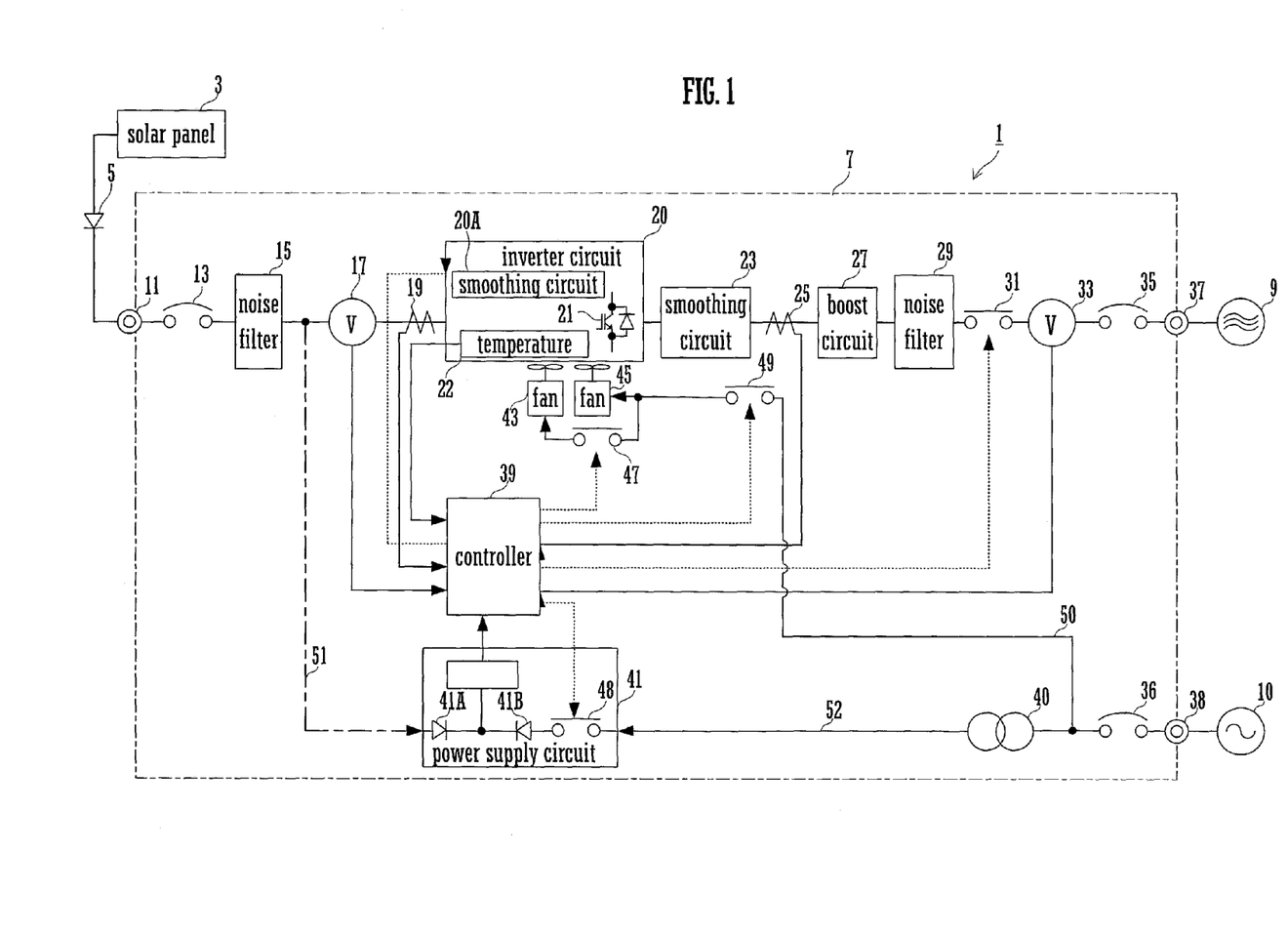
FIG. 1 is a block diagram of a utility interconnection inverter device according to an embodiment of the present invention.

FIG. 1 is a block diagram of a utility interconnection inverter device according to an embodiment of the present invention. As shown in FIG. 1, a solar panel apparatus 1 includes a solar panel 3 that is an electricity generation device, and a utility interconnection inverter device 7 (hereinafter termed simply an "inverter device").

The solar panel 3 is connected to a terminal 11 of the inverter device 7 via a diode 5. When light such as sunshine or the like shines upon the solar panel 3, the energy in the light is converted into electrical power (i.e. generates electricity), and DC power is outputted.

A terminal 37 of the inverter device 7 is connected to a system power supply 9, and a terminal 38 is connected to a control power supply 10. The control power supply 10 is a system power supply that supplies power to a control system of the inverter device 7. The system power supply 9 and the control power supply 10 are different power systems: the system power supply 9 supplies three phase AC power, while the control power supply 10 supplies single phase AC power.

The inverter device 7 eliminates noise included in the DC power generated by the solar panel 3 with a noise filter 15, and converts the DC power into AC power by performing pulse width modulation (PWM) with an inverter circuit 20. And the inverter device 7 smoothes the AC power outputted by the inverter circuit 20 with a smoothing circuit 23, and increases its voltage with a boost circuit 27. Moreover, the inverter device 7 eliminates any noise included in the boosted AC power with a noise filter 29, and then feeds it into the system power supply 9. Furthermore, a controller 39 and fans 43 and 45 of the inverter device 7 receive supply of power from the control power supply 10.

During maintenance or the like, the connection of the inverter device 7 and the solar panel 3 can be interrupted by an interceptor 13 (a MCCB: a molded case circuit breaker). Furthermore during maintenance, or if excessive current flows, or upon abnormality of the inverter device 7 or the like, the connection of the inverter device 7 to the system power supply 9 can be interrupted with an interceptor 35 (i.e. a MCCB). Moreover, when a system anomaly has occurred or the like, the connection of the inverter device 7 and the system power supply 9 can be interrupted with a magnetic contactor 31 which is a second switch. And during maintenance or if excessive current flows or the like, the connection of the inverter device 7 and the control power supply 10 can be interrupted with an interceptor 36 (i.e. a MCCB).

The inverter circuit 20 comprises a smoothing circuit 20A and a plurality of switching elements 21. In the smoothing circuit 20A, a capacitor and a resistor not shown in the figures are connected in parallel, and these smooth the DC power from the solar panel, which fluctuates greatly. It should be understood that, when the plurality of switching elements 21 are stopped, the current supplied from the solar panel flows to the smoothing circuit 20A.

The plurality of switching elements 21 convert the DC power generated by the solar panel 3 into AC power by switching between ON and OFF at predetermined timings. For example, if the DC power generated by the solar panel 3 is to be converted into three phase AC power, then, as is per se well known, the inverter circuit 20 will include six switching elements 21.

The controller 39 detects the DC voltage and the DC current outputted by the solar panel 3 with a voltage detector 17 and a current detector 19. The controller 39 then calculates the DC power from the DC voltage and the DC current that have been detected. And, if the calculated DC power is greater than or equal to a generated power decision value, then the controller 39 changes over the magnetic contactor 31 from open to closed, since enough power is being generated by the solar panel 3 to be fed into the system power supply 9.

Moreover, the controller 39 detects the AC current and the AC voltage of the system power supply 9 with a current detector 25 and a voltage detector 33. And the controller 39 controls the switching of the plurality of switching elements 21 housed within the inverter circuit 20 on the basis of the AC current and the AC voltage which have thus been detected. Furthermore, the controller 39 adjusts the AC power (i.e. the current and the voltage) converted by the inverter circuit 20 to the voltage, the phase, and the frequency of the system power supply.

Also if, in rainy weather or evening or the like, the DC power calculated from the DC voltage and the DC current detected by the voltage detector 17 and the current detector 19 is less than the generated power decision value, then the controller 39 considers that the solar panel 3 is generating almost no power. In this case, the controller 39 stops the switching operation of the plurality of switching elements 21 of the inverter circuit 20, thus preventing wastage of power. Moreover, since no feed-in to the system power supply 9 is being performed, accordingly the magnetic contactor (switch) 31 is changed over from closed to open.

When the power generated by the solar panel is less than the power consumed by the inverter device 7, which is a power supply circuit, the meaning of feeding in power to the system power supply disappears, because the power consumed by the power supply circuit becomes greater than the power fed in to the system power supply. Thus, in this type of case, the operation of the switching elements is stopped, so than the consumption of power by the inverter circuit 20 and the controller 39 that are included in the power supply circuit is eliminated. It should be understood that the generated power decision value is a threshold value for making a decision as to whether or not it is possible for the power detected by the voltage detector 17 and the current detector 19 to be fed in to the system power supply. This generated power decision value may be set to, for example, 15 W, although it will be different, depending upon the equipment. It should be understood that the power supply circuit includes the transformer 40, a power circuit 41, the power line 50, and a power line 52.

The controller 39 operates upon power supplied from the power circuit 41. The power line 52 is connected to the input side of this power circuit 41. Furthermore, power is supplied from the control power supply 10 to the power circuit 41, via the interceptor 36, the transformer 40, and the power line 52.

Furthermore, the power line 51 which branches off from between the noise filter 15 and the voltage detector 17 is connected to a input terminal of the power circuit 41, and supplies DC power from which noise has been eliminated by the noise filter 15 to the power circuit 41.

If the structure described above is employed, then a full wave rectification circuit should be provided on the input side of the power circuit 41, so as to ensure that DC power is always supplied to the power circuit 41. Furthermore, the voltage that the control power supply 10 usually supplies via the transformer 40 to the power circuit 41 is set to be higher than the voltage which the solar panel 3 applies to the power circuit 41. By utilizing this structure, a voltage is applied to the input terminal of the power circuit 41 that is the logical sum of the voltage of the control power supply 10 and the voltage of the solar panel 3. In other words, power is usually supplied to the power circuit 41 from the control power supply 10. On the other hand, if the control power supply 10 ceases to provide power, then the power generated by the solar panel 3 is supplied to the power circuit 41.

Furthermore, a diode 41A may be provided so as to prevent current flowing from the control power supply 10 via the power circuit 41 into the inverter circuit 20. Moreover, a diode 41B may be provided so as to prevent current from flowing from the solar panel 3 via the power circuit 41 to the control power supply 10.

It should be understood that the diodes 41A and 41B may be provided as well as providing the full wave rectification circuit mentioned above; or the diodes 41A and 41B may be provided instead of the full wave rectification circuit.

Moreover, with this inverter device 7, a structure may be provided that stops supply of power from the control power supply 10 to the power circuit 41 when the solar panel 3 is not generating any electricity. Since the solar panel 3 does not generate power during the night time, power used to operate the controller 39 would be wasted. Due to this, it is possible to prevent wastage of power by arranging to stop the supply of power from the control power supply 10 to the power circuit 41.

For example, in the power circuit 41, a magnetic contactor 48 that is a switch may be provided in the power line 52, i.e. in the electrical circuit that connects the diode 41B and the transformer 40. Moreover, since as described above the controller 39 periodically monitors the DC power that is being generated by the solar panel 3, accordingly it may be set to change over this magnetic contactor 48 from closed to open when night falls and the power generated by the solar panel 3 becomes lower than a night time decision value, i.e. a threshold value for deciding that it is night time. This night time decision value will be different according to the equipment; it may for example be set to around 0.1% of full rating, in consideration of the ambient illumination during the night time and in consideration of the starting load of the inverter device 7 and so on.

While at this time the power circuit 41 is connected to the solar panel 3 via the power line 51, since as described above the solar panel 3 does not generate any electricity during the night time, accordingly no power is supplied to the controller 39, so that the controller 39 does not operate.

When the night time ends and morning dawns and sunlight shines upon the solar panel 3 so that it starts to generate electricity, then this power is supplied to the power circuit 41 via the power line 51. And the controller 39 starts its operation upon receiving this supply of power from the power circuit 41. Moreover, the controller 39 starts to monitor the DC power generated by the solar panel 3 with the current detector 19 and the voltage detector 17. When the DC power generated by the solar panel 3 becomes greater than or equal to the night time decision value, then the controller 39 changes over the magnetic contactor 48 from open to closed. Since, due to this, constant power is always supplied to the power circuit 41 from the control power supply 10, accordingly it is possible to ensure that the controller 39 operates stably.

Furthermore, the inverter circuit 20 includes two fans 43 and 45 that cool the plurality of switching elements 21, and a temperature measurement unit 22 that measures the temperature of the plurality of switching elements 21. Power is supplied from the control power supply 10 to the fans 43 and 45 via a power line 50 that branches off from between the interceptor 36 and a transformer 40.

The fan 43 is connected to a magnetic contactor 47, and the fan 45 and the magnetic contactor 47 are connected to a magnetic contactor 49. When the controller 39 closes the magnetic contactor 49, the fan 45 operates and cools the plurality of switching elements 21. Furthermore, when the controller 39 closes the magnetic contactor 49 and the magnetic contactor 47, then the fan 43 and the fan 45 operate and cool the plurality of switching elements 21.

The magnetic contactor 49 is set to operate together with the magnetic contactor 31. As described above, when the controller 39 detects enough power generated by the solar panel 3, the magnetic contactor 31 changes over from open to closed, and the magnetic contactor 49 also changes over from open to closed at the same time. Accordingly, when the magnetic contactor 31 changes over to closed, the fan 45 operates and cools the plurality of switching elements 21 of the inverter circuit 20.

Also if, in rainy weather or evening or the like, the DC power is less than the generated power decision value, the controller 39 stops the switching operation of the plurality of switching elements 21 of the inverter circuit 20, and changes over the magnetic contactor (switch) 31 is from closed to open. In this case, the magnetic contactor 31 and the magnetic contactor 49 operate together, accordingly the magnetic contactor 49 also changes over from closed to open, so that the fans 43 and 45 stop. Furthermore, when the magnetic contactor 31 changes over from closed to open, if the magnetic contactor 47 is closed, then the controller 39 changes over the magnetic contactor 47 from closed to open at the same time.

The controller 39 periodically monitors the temperature of the switching elements 21 as detected by the temperature measurement unit 22. Moreover, the controller 39 periodically monitors the DC power generated by the solar panel 3, on the basis of the DC current detected by the current detector 19 and the DC voltage detected by the voltage detector 17. It should be understood that the voltage detector 17 and the current detector 19 are equivalent to a power detection unit.

The controller 39 changes over the magnetic contactor 47 to closed when the power generated by the solar panel 3 becomes greater than or equal to a cooling decision value for deciding whether additional cooling is necessary (necessity for additional cooling), or when it becomes greater than or equal to a cooling decision temperature for deciding whether additional cooling of the switching elements 21 is necessary (necessity for additional cooling). When the magnetic contactor 47 becomes closed, the fan 43 operates along with the fan 45 which is already operating, and the amount of cooling air flow increases and cools the switching elements 21 of the inverter circuit 20.

It should be understood that this cooling decision value may, for example, be set to 1 kW, although it will depend upon the equipment; and the cooling decision temperature may, for example, be set to 100° C.

Moreover, it should be understood that it would also be possible for the controller 39 to perform control so as to change the amount of cooling air flow from the fans 43 and 45, according to the power generated by the solar panel 3 or according to the temperature of the switching elements 21. Furthermore, the number of fans provided is not limited to being two; it would also be possible to use a larger plurality of fans.

It should be understood that the relationship between the various decision values for the DC power is that: the cooling decision value>the generated power decision value>the night time decision value.

Figure 2A:
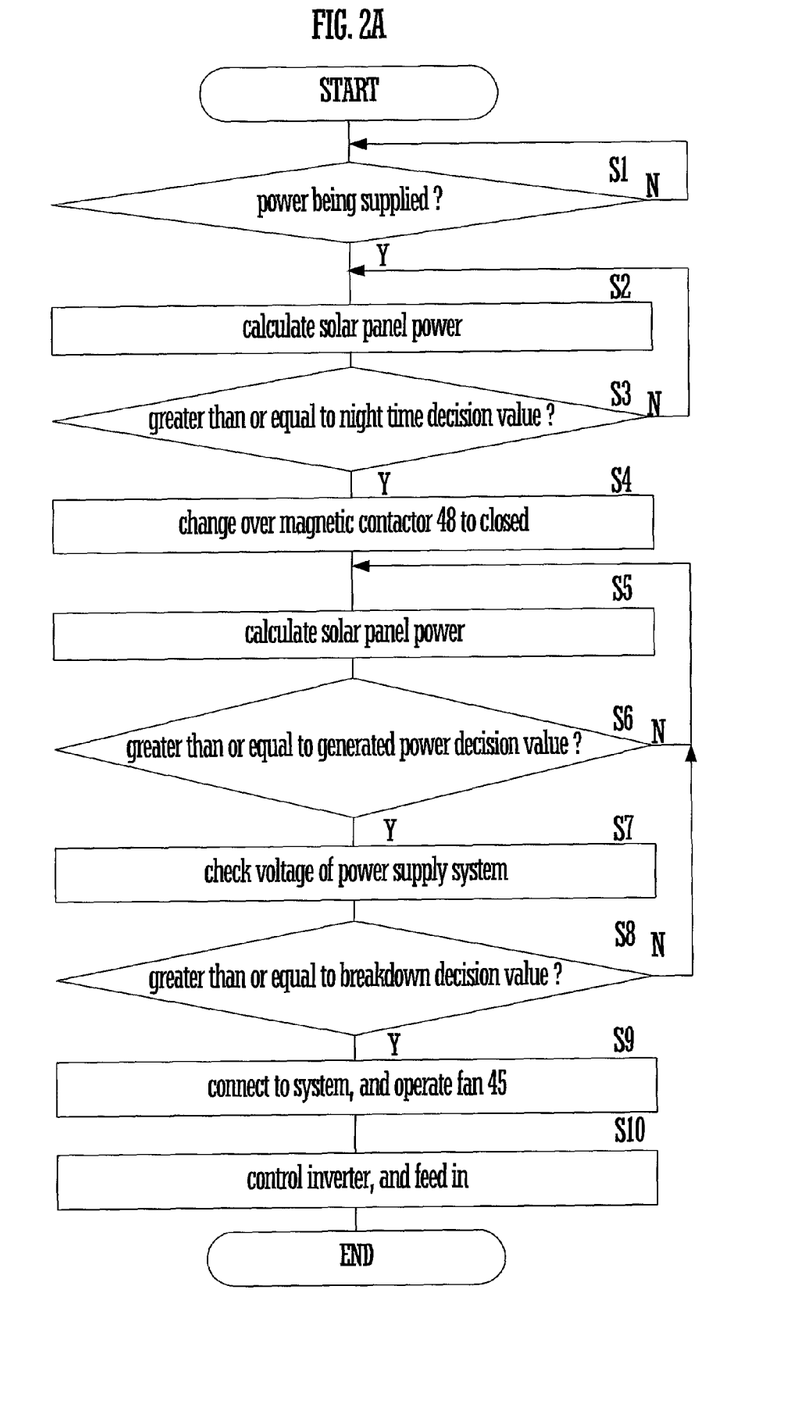
FIGS. 2A and 2B are a flowchart for explanation of the operation of this inverter device.
Figure 2B:
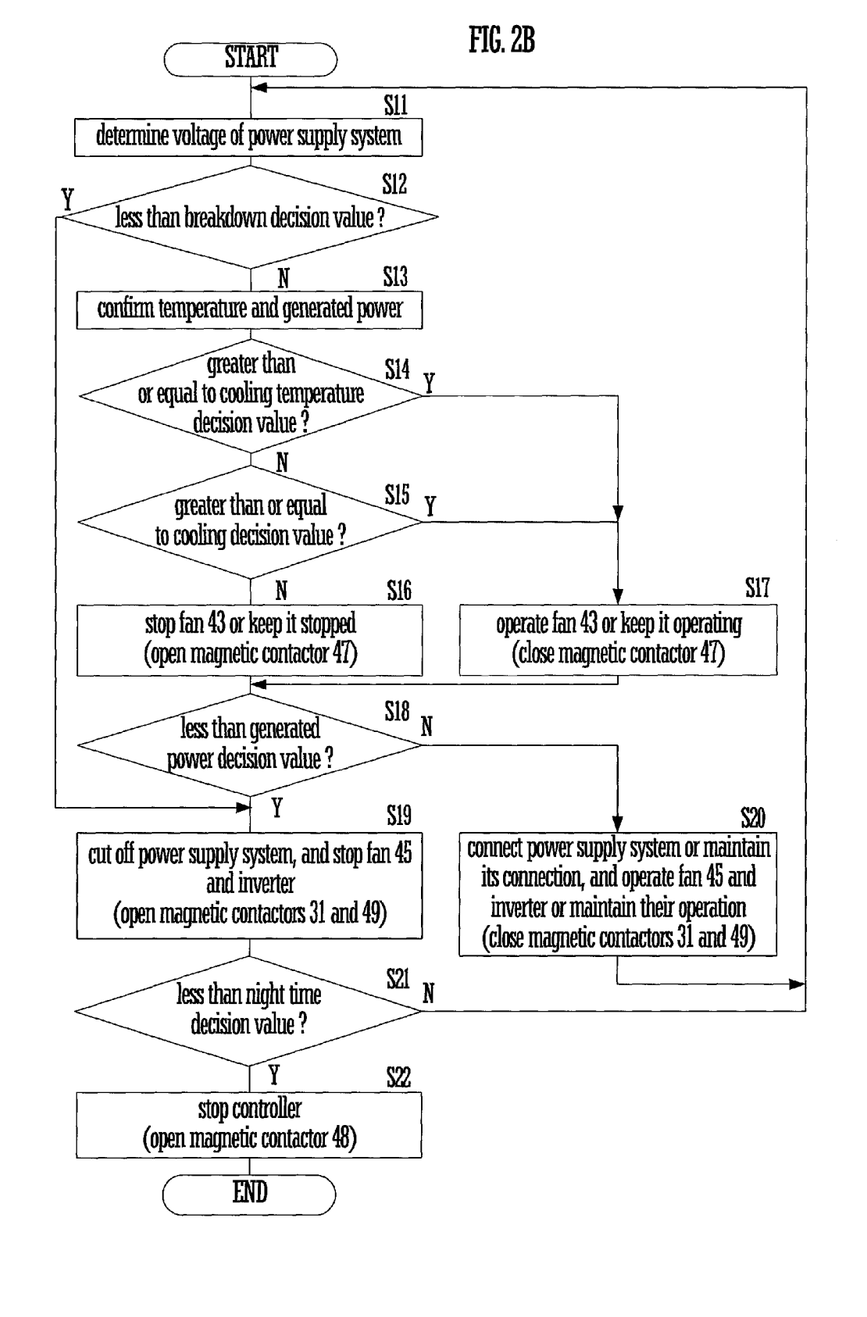

Next, the operation of this inverter device 7 will be explained using a flow chart. FIGS. 2A and 2B are a flow chart for explanation of the operation of this inverter device. FIG. 2A shows the operation during starting, while FIG. 2B shows the operation during running. In the initial state, the interceptors 13, 35, and 36 are closed, while the magnetic contactors 31, 47, 48, and 49 are open.

When night time ends and morning dawns, sunlight starts to shine upon the solar panel 3, so that it starts to generate electricity. And, when supplied with power from the solar panel 3 via the power line 51, the power circuit 41 starts to supply power to the controller 39.

The controller 39 is stopped until power is supplied from the power circuit 41 (S1: N). When power is supplied from the power circuit 41 (51: Y), the controller 39 starts, detects the DC voltage and the DC current being generated by the solar panel 3 with the voltage detector 17 and the current detector 19, and calculates the DC power (S2). And the controller 39 compares the DC power being generated by the solar panel 3 and the night time decision value, and continues the processing of the steps S2 and S3 while the DC power being generated by the solar panel 3 is less than the night time decision value (S3: N). But, when the DC power being generated by the solar panel 3 becomes greater than or equal to the night time decision value (S3: Y), then the controller 39 changes over the magnetic contactor 48 from open to closed (S4). When the magnetic contactor 48 is thus changed over to closed, power is supplied from the control power supply 10 to the power circuit 41.

Next, the controller 39 detects the DC voltage and the DC current of the electricity generated by the solar panel 3 with the voltage detector 17 and the current detector 19, and calculates the DC power (S5). And the controller 39 compares the DC power generated by the solar panel 3 with the generated power decision value (which is greater than the night time decision value), and repeats the processing of the steps S5 and S6 while the DC power generated by the solar panel 3 remains less than the generated power decision value (S6: N). And, when the DC power becomes greater than or equal to the generated power decision value (S6: Y), the controller 39 detects the AC voltage of the system power supply 9 with the voltage detector 33 (S7). If the AC voltage that has thus been detected is less than a breakdown decision value that determines the occurrence of a system anomaly (S8: N), then the controller 39 performs the step S5 for a second time, since there is a possibility that a system anomaly is occurring.

But if the AC voltage is greater than or equal to the breakdown decision value (S8: Y), then the controller 39 connects the inverter device 7 to the system power supply 9 by changing over the magnetic contactor 31 to closed. Moreover, since the magnetic contactor 31 and the magnetic contactor 49 operate together, accordingly the magnetic contactor 49 also becomes closed, and the cooling fan 45 starts (S9).

While detecting the AC voltage and the AC current of the system power supply 9 with the voltage detector 33 and the current detector 25, the controller 39 controls the switching of the plurality of switching elements internally housed in the inverter circuit 20 on the basis of the AC voltage and the AC current that have thus been detected. And the controller 39 adjusts the AC power converted by the inverter circuit 20 (i.e. its current and its voltage) to the voltage, the phase, and the frequency of the system power supply 9, and feeds that converted AC power into the system power supply 9 (S10).

Next, the inverter device 7 performs processing during running as explained below.

The controller 39 periodically detects the temperature of the switching elements 21 with the temperature measurement unit 22.

The controller 39 detects the AC voltage of the system power supply 9 with the voltage detector 33 (S11). And, if the detected AC voltage is less than the breakdown decision value (S12: Y), then the controller 39 performs the processing of a step S19, since there is a possibility that a system anomaly is occurring. In other words, the controller 39 cuts the inverter device 7 off from the system power supply 9 by changing over the magnetic contactor 49 to open. Moreover, since the magnetic contactor 31 and the magnetic contactor 49 operate together, accordingly the magnetic contactor 49 also opens. Furthermore, if the magnetic contactor 47 is closed, it is changed over to open. Due to this, the cooling fans 43 and 45 stop. And, at this time, the controller 39 stops the operation of the switching elements 21 of the inverter circuit 20 (S19). Moreover if the state in which the AC voltage is less than the breakdown decision value is continuing and already the magnetic contactors 31 and 49 are open and the switching elements 21 of the inverter circuit 20 are stopped, then the controller 39 maintains this state. Then the controller 39 performs the processing of a step S21.

On the other hand, if the AC voltage is greater than or equal to the breakdown decision value (S12: N), then the controller 39 detects the values of the DC voltage and the DC current generated by the solar panel 3 with the voltage detector 17 and the current detector 19, and calculates the DC power. Moreover, the controller 39 detects the temperature of the switching elements 21 with the temperature measurement unit 22. And the controller 39 confirms these values (S13).

If the DC power is greater than or equal to the cooling temperature decision value (S14: Y) or the switching elements 21 are greater than or equal to the cooling decision value (S14: N, S15:Y), then the controller 39 changes over the magnetic contactor 47 to closed. Furthermore, if the magnetic contactor 47 is already closed, then the controller 39 maintains it in this state. When the magnetic contactor 47 is closed the fan 43 operates, and cools the plurality of switching elements 21 of the inverter circuit along with the fan 45 which is already operating (S17). And next the controller 39 performs the processing of the step S18.

Moreover, if the switching elements 21 are less than the cooling decision temperature (S14: N) and also the DC power is less than the cooling decision value (S15: N), then the controller 39 changes over the magnetic contactor 47 to open, thus stopping the operation of the fan 43 (S16). And if the magnetic contactor 47 is already open, then the controller 39 maintains it in this state.

If the DC power is greater than or equal to the generated power decision value (S18: N), then, when the plurality of switching elements 21 are already operating, the controller 39 maintains this state. Furthermore if, up until directly before the DC power was less than the generated power decision value, then the controller 39 starts the operation of the plurality of switching elements 21 (S20). And then the processing of the step S11 is performed.

On the other hand, if the DC power is less than the generated power decision value (S18: Y), then the controller 39 performs the processing of the previously described step S19.

Furthermore, if the DC power is greater than or equal to the night time decision value (S21: N), then the controller 39 performs the processing of the step S11.

On the other hand, if the DC power is less than the night time decision value (S21: Y), then the controller 39 changes over the magnetic contactor 48 to open (S22). At this time, since the DC power generated by the solar panel 3 is less than the night time decision value, accordingly no power is supplied from the solar panel 3 to the power circuit 41. Furthermore, since the magnetic contactor 48 is changed over to open, accordingly to power is supplied from the control power supply 10. Due to this, no power is supplied to the controller 39, so that the operation of the controller 39 is stopped.

Figure 3:
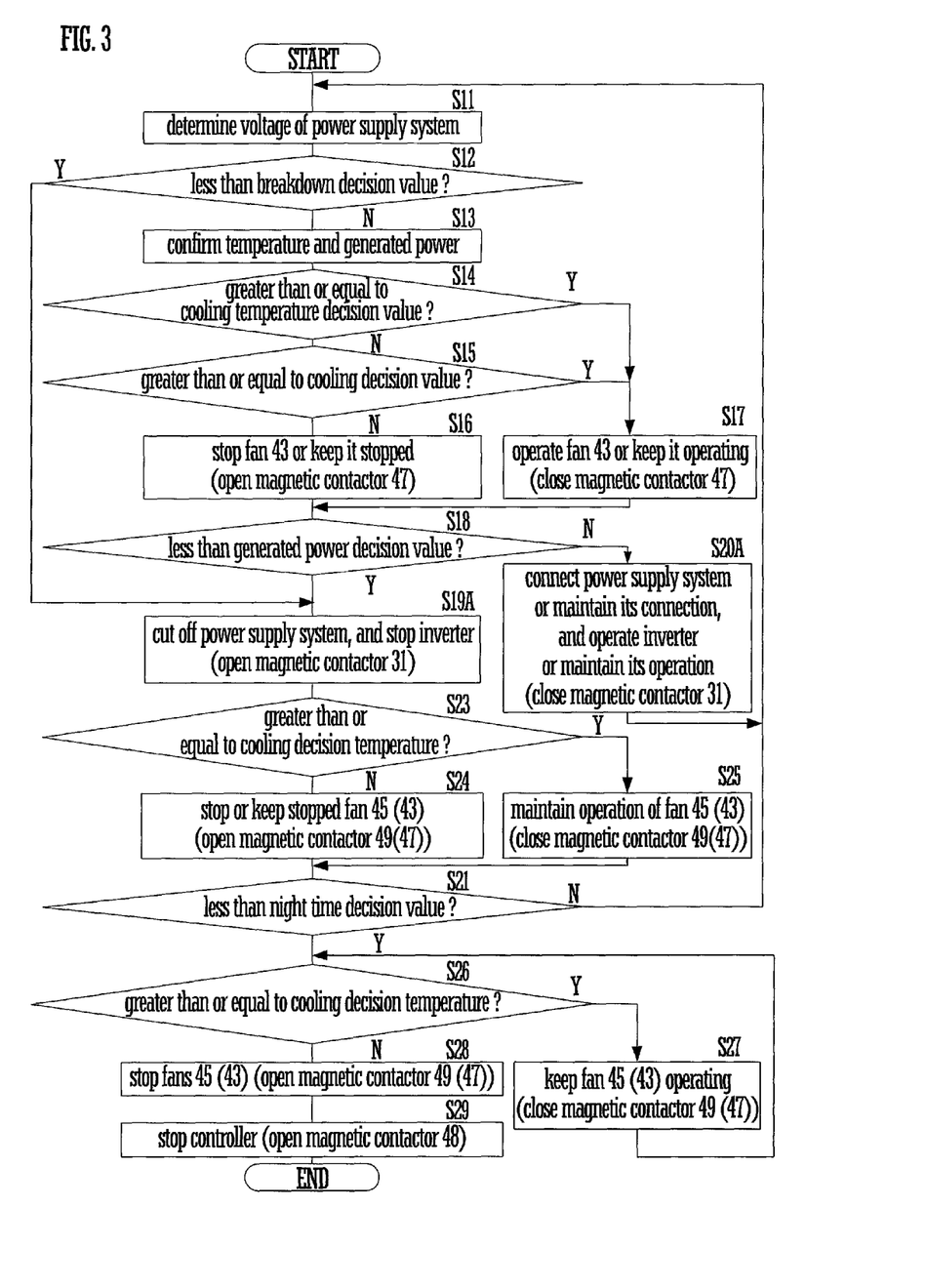
FIG. 3 is another flow chart for explanation of the operation of this inverter device.

Next, it would also be acceptable to adapt inverter device 7 so as to operate the fans 43 and 45 according to the value of the power generated by the solar panel 3 or according to the temperature of the switching elements 21, without operating the magnetic contactor 31 and the magnetic contactor 49 together. A case in which a structure of this type is employed will now be explained. FIG. 3 is a flow chart for explanation of a mode of operation of the inverter device different to that of FIG. 2B. A portion of the flow chart shown in FIG. 3 is different from the flow chart shown in FIG. 2B. Due to this, in the following explanation, the explanation will primarily be directed to this different portion. Moreover, to steps which perform the same processing as processing explained with reference to FIG. 2B, the same reference symbols will be appended.

In a manner similar to FIG. 2B, in the steps S11 through S18, the controller performs similar processing to that of FIG. 2B.

If the DC power generated by the solar panel 3 is greater than or equal to the generated power decision value (S18: N), then the controller 39 keeps the magnetic contactor 31 closed, and continues the operation of the switching elements 21 of the inverter circuit 20 (S20A). And then the processing of the step S11 is performed. On the other hand, if the DC power generated by the solar panel 3 is less than the generated power decision value (S18: Y), then the controller 39 cuts off the inverter circuit 20 from the system power supply 9 by changing over the magnetic contactor 31 to open. Moreover, it stops the operation of the switching elements 21 of the inverter circuit (S19A). And then the following processing is performed.

That is, the controller 39 makes a decision as to whether or not the temperature of the plurality of switching elements 21 as measured by the temperature measurement unit 22 is greater than or equal to the cooling decision temperature (S23). And, if it is greater than or equal to the cooling decision temperature (S23: Y), then the controller 39 keeps the magnetic contactor 49 in the closed state. Moreover, if the magnetic contactor 47 is closed, then this state is maintained. In other words, the fan 45 (and the fan 43) are operated, so that the switching elements 21 of the inverter circuit 20 are cooled (S25).

On the other hand, if it is less than the cooling decision temperature (S23: N), then the controller 39 changes over the magnetic contactor 49 to open. Moreover, if the magnetic contactor 49 is open, then this state is maintained. In other words the fan 45 is stopped, since the switching elements 21 of the inverter circuit 20 are being sufficiently cooled (S24).

Next, the controller performs the processing of the step S21 (the decision related to the night time decision value). And if the DC power is greater than or equal to the night time decision value (S21: N), then the controller performs the processing of the step S11.

On the other hand, if the DC power is less than the night time decision value (S21: Y), then the controller 39 makes a decision as to whether or not the switching elements 21 of the inverter circuit 20 are at greater than or equal to the cooling decision temperature (S26). And if the switching elements 21 of the inverter circuit 20 are at greater than or equal to the cooling decision temperature, then the controller 39 keeps the magnetic contactor 49 (47) closed. And thus the fans 45 and 43 are driven until the switching elements 21 of the inverter circuit 20 drop below the cooling decision temperature (S27).

But, if the switching elements 21 of the inverter circuit 20 are at less than the cooling decision temperature, then the controller 39 changes over the magnetic contactor 49 (47) to open, and thus stops the fans 45 (43) (S28).

Furthermore, the controller 39 changes over the magnetic contactor 48 to open (S29). At this time, since the DC power generated by the solar panel 3 is less than the night time decision value, accordingly no power is supplied from the solar panel 3 to the power circuit 41. Moreover, since the magnetic contactor 48 is changed over to open, no power is supplied from the control power supply 10 either. Due to this, no power is supplied to the controller 39, so that the operation of the controller 39 is stopped.

With this inverter device 7, by operating the magnetic contactor 31 and the magnetic contactor 49 together in this manner, when the inverter circuit 20 has been stopped, the switching elements 21 are cooled perfectly. Due to this, it is possible to prevent deterioration of the switching elements 21 due to heat.

In this manner, with this inverter device 7, stabilized power is supplied from the control power supply 10 to the power circuit 41 and to the fans 43 and 45. Accordingly, no loss of power takes place due to power conversion or cooling, and it is possible to feed in the power generated by the solar panel 3 to the system power supply. Moreover, if the utility interconnection inverter device of the present invention is applied to a system in which the power generated by a solar panel is sold to the power company, then the power generated by the solar panel is fed in to the system power supply without any of it being consumed by the controller or the fans. Due to this, it is possible to sell more power generated by the solar panel. And, because of this, it becomes possible to amortize the solar panel apparatus at an earlier stage.

The invention claimed is:

1. A utility interconnection inverter device, comprising:
an inverter circuit that comprises a plurality of switching elements, and that converts electrical power generated by a solar panel from DC to AC by the switching of the plurality of switching elements; and
a controller that controls the switching of the plurality of switching elements; and
wherein the AC power converted by the inverter circuit is fed into a system power supply;
characterized by comprising:
a power circuit to which are connected a first circuit by which power for the controller is supplied at a first voltage from the solar panel, and a second circuit by which power for the controller is supplied at a second voltage that is higher than the first voltage from a control power supply which is different from the system power supply; and that selects, from among the first circuit and the second circuit, that circuit by which power for the controller is supplied at higher voltage, and supplies power to the controller from that selected circuit;
a first switch that opens and closes the second circuit, the first switch being connected in series to the second circuit; and
a power detection unit that detects the power generated by the solar panel;
and in that the controller:
changes over the first switch from closed to open, when the power detected by the power detection unit becomes less than a night time decision value for deciding that it is night time; and
changes over the first switch from open to closed, when the power detected by the power detection unit becomes greater than or equal to the night time decision value.

2. A utility interconnection inverter device according to claim 1, wherein the controller stops the switching of the plurality of switching elements, when the power detected by the power detection unit becomes lower than a generated power decision value for making a decision as to whether or not feeding in to the system power supply is possible.

3. A utility interconnection inverter device according to claim 1, further comprising a second switch that connects the inverter circuit and the system power supply, and a voltage detector that detects the voltage of the system power supply; and
wherein the controller changes over the second switch from closed to open, when the voltage of the system power supply detected by the voltage detector becomes less than a breakdown decision value for deciding upon the occurrence of a system anomaly.

4. A utility interconnection inverter device according to claim 1, further comprising a fan that cools the plurality of switching elements, and a temperature measurement unit that measures the temperature of the plurality of switching elements; and
wherein the controller increases the amount of cooling air flow to the fan when the power detected by the power detection unit becomes greater than or equal to a cooling decision value for deciding that it is necessary to provide additional cooling, or when the temperature measured by the temperature measurement unit becomes greater than or equal to a cooling decision temperature for deciding that it is necessary to provide additional cooling.

5. A utility interconnection inverter device according to claim 4, wherein the controller continues to operate the fan until the temperature measured by the temperature measurement unit becomes lower than the cooling decision temperature.

* * * * *